(12) United States Patent
Chin et al.

(10) Patent No.: US 6,754,014 B1
(45) Date of Patent: Jun. 22, 2004

(54) COLOR WHEEL

(75) Inventors: Ke-Shu Chin, Junghe (TW);
Chih-Neng Chang, Taipei (TW);
Kuang-Hua Chang, Junghe (TW);
Chih-Huang Wang, Shulin (TW);
An-Hwa Yu, Shinjuang (TW); Yin-Tai Keng, Taipei (TW)

(73) Assignee: Prodisc Technology Inc., Taipei (TW)

( * ) Notice: Subject to any disclaimer, the term of this patent is extended or adjusted under 35 U.S.C. 154(b) by 0 days.

(21) Appl. No.: 10/369,579

(22) Filed: Feb. 21, 2003

(51) Int. Cl.⁷ .............................. G02B 5/22; G02B 7/00

(52) U.S. Cl. ..................... 359/892; 359/885; 359/891; 348/743; 356/418; 362/293

(58) Field of Search ............................... 359/891–892, 359/885, 889; 348/743; 353/84; 356/418; 362/293, 322–323

(56) References Cited

U.S. PATENT DOCUMENTS

| | | | | |
|---|---|---|---|---|
| 4,527,186 A | * | 7/1985 | Acker | 358/1 |
| 4,800,474 A | * | 1/1989 | Bornhorst | 362/293 |
| 5,777,694 A | * | 7/1998 | Poradish | 348/743 |
| 2002/0003704 A1 | * | 1/2002 | Ohmae et al. | 362/293 |
| 2003/0214740 A1 | * | 11/2003 | Wong et al. | 359/892 |

* cited by examiner

*Primary Examiner*—Drew A. Dunn
*Assistant Examiner*—Leo Boutsikaris
(74) *Attorney, Agent, or Firm*—Birch, Stewart, Kolasch & Birch, LLP

(57) ABSTRACT

A color wheel including a motor, a vibration damping element and a color filter. In this case, the motor has a housing and a motor body, and the housing is set at the central axis of the motor body. The vibrating damping element is set on the housing of the motor. The color filter is set on the housing of the motor, so that the vibrating damping element is positioned between the motor and the color filter. In addition, two other color wheels are provided.

25 Claims, 5 Drawing Sheets

COLOR WHEEL

BACKGROUND OF THE INVENTION

1. Field of the Invention

The invention relates to a color wheel and more particularly, this invention relates to a color wheel, which is used in projection technology.

2. Description of the Related Art

Digital Light Processing (DLP) is a widely used projection technology. DLP has several advantages, including high brightness, accurate tone reproduction, a fast response time, noise-free operation, and thin, light composition.

In a DLP projector, a digital control method and a reflection principle are adopted. Light rays from the light source are collected and focused by the lenses to pass through three color filters. Then, the light rays are projected onto a digital micro-mirror device (DMD). Since the DMD includes several movable micro mirrors, driving electrodes may control the tilt angle and deflection time of each movable mirror. Then, the light rays are projected to form an image by switching the direction of the light ray reflections.

In the DLP projector, a color wheel 4 for generating the light rays of several colors is generally provided. Herein, the color wheel 4 mainly includes a motor 41, a color filter 42 and a cap 43. The motor 41 includes a housing 411 and a motor body 412, which rotates together with the housing 411. Referring to FIG. 1A, the cap 43 is mounted on the color filter 42, so that the color filter 42 is between the cap 43 and the motor 41. In addition, referring to FIG. 1B, the cap 43 is between the motor 41 and the color filter 42.

Moreover, the color wheel is also used in Liquid Crystal on Silicon (LCOS) projectors and Liquid Crystal Display (LCD) projectors. Herein, the function of the color wheel is the same as in DLP projectors for separating the light rays into several colors.

In general, the motor for the color wheel rotates at a speed higher than 7200 rpm. When the rotation center of the color filter is away from the central axis of the rotation shaft (i.e., when the rotation center is not located on the central axis of the rotation shaft), or friction between the color filter and the air is produced, the color filter may be adversely influenced by vibration. Furthermore, the color wheel may also be adversely influenced by noise (volume is about 58 dBA, detect far from 4 cm).

Currently, the development of the projection system goes toward minimization and portability, so the quality of the product is deeply influenced by noise.

It is therefore an important objective of the invention to provide a color wheel to solve the problem mentioned above.

SUMMARY OF THE INVENTION

An objective of the invention is to provide a color wheel, which may have the advantages of solving the vibration problems of the color filter.

To achieve the above-mentioned objective, the invention provides a color wheel including a motor, a vibration damping element and a color filter. In this case, the motor has a housing and a motor body and the housing is set at the central axis of the motor body. The vibration damping element is set on the housing of the motor. The color filter is set on the housing of the motor, so that the vibration damping element is positioned between the motor and the color filter. In addition, the invention also provides other two color wheels.

As mentioned above, the invention provides a color wheel, in which a vibration damping element or a vibration damping material is used. Compared to the prior art, the vibration of the color filter may be reduced in this invention. Furthermore, since the vibration of the color filter may be reduced, noise produced by the vibration may also be reduced. Moreover, the quality of the color wheel may also be improved. In addition, when the cap is made of a vibration damping material, not only the cap may enlarge the contact area between the color filter and the motor, but also the vibration and noise caused by the color filter is further reduced.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given in the herein below illustration, and thus are not limitative of the present invention, and wherein.

DETAILED DESCRIPTION OF THE INVENTION

Figure 1A:
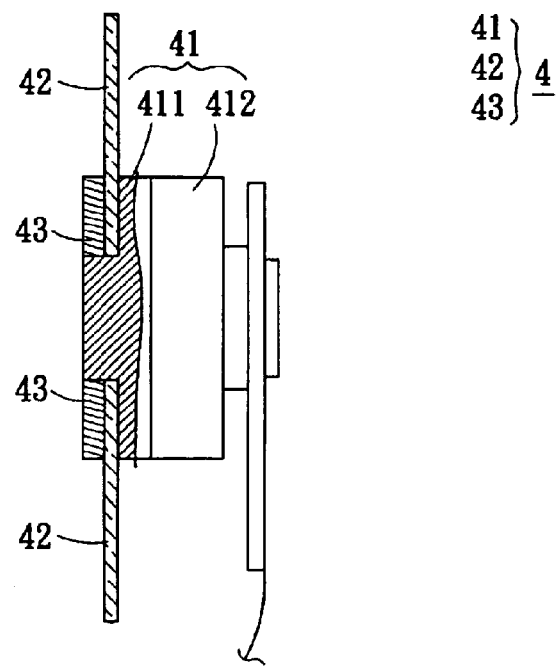
FIG. 1A is a schematic illustration that shows a cross-sectional view of a conventional color wheel.
Figure 1B:
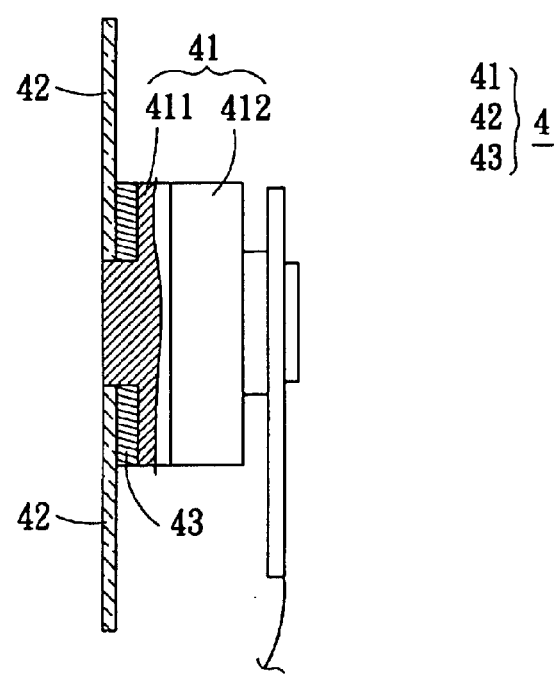
FIG. 1B is a schematic illustration that shows a cross-sectional view of another conventional color wheel.

The color wheel in accordance with preferred embodiments of hte invention will be described with reference to the accompanying drawings.

The First Embodiment

Referring to FIG. 2A, FIG. 2B, FIG. 2C and FIG. 2D, a color wheel 1 provided by the first embodiment of the invention includes a motor 11, a vibration damping element 12, and a color filter 13. The motor 11 includes a housing 111 and a motor body 112, the housing 111 is at the central axis of the motor body 112. The vibration damping element 12 is set on the housing 111 of the motor 11. The color filter 13 is also set on the housing 111 of the motor 11, so that the vibration damping element 12 is positioned between the motor 11 and the color filter 13.

Figure 2A:
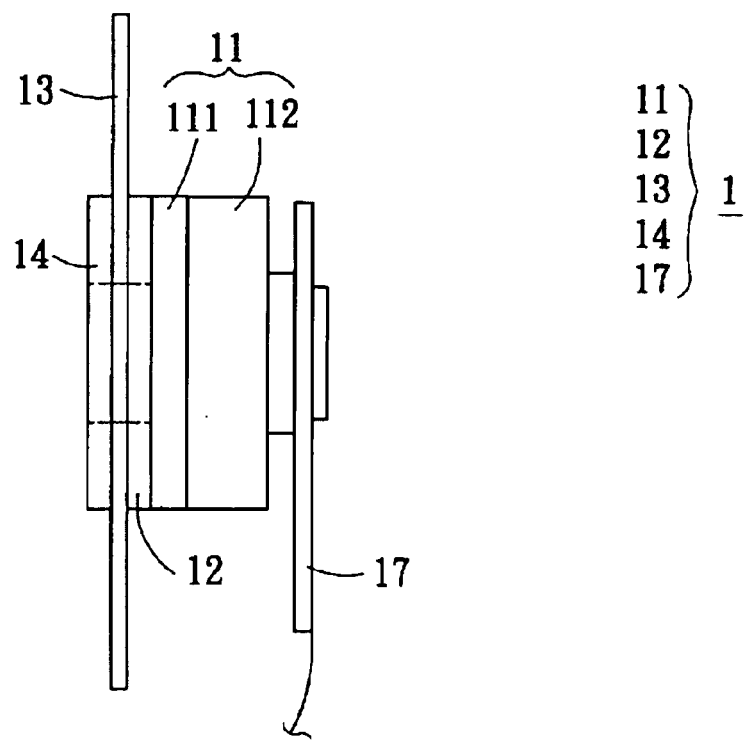
FIG. 2A is a schematic illustration that shows a side view of the color wheel in accordance with the first embodiment of the invention.

Referring to FIG. 2A, the motor 11 includes a housing 111 and a motor body 112. The housing 111 is at the central axis of the motor body 112. In the current embodiment, the motor body 112 mainly includes a shell (not shown), a magnetic ring (not shown), laminated steel stack (not shown) and a coil (not shown). When the coil is turned on, the laminated steel stack produces a magnetic force and a magnetic field. The positive or negative properties as well as the intensity of the current may cause the magnetic field to vary in an ordered manner. That is, a rotary magnetic field will act in accordance with the magnetic ring, which will rotate accordingly.

Referring again to FIG. 2A, the vibration damping element 12 is set on the housing 111 of the motor 11. In this case, the vibration damping element 12 is set on the housing 111 by way of, for example, an adhering, a fitting process or placing the vibration damping element 12 over the housing 111. In the current embodiment, the vibration damping element 12 may be a ring-shaped element, a substantially ring-shaped element or a shape composed of several sectors. Moreover, the vibration damping element 12 is made of a macromolecule material such as rubber, silicon glue or plastic. In the current embodiment, the vibration damping element 12 is also used to enlarge the contact area between the color filter 13 and the housing 111.

Referring again to FIG. 2A, the color filter 13 is set on one side of the housing 111, so that the vibration damping element 12 is positioned between the motor 11 and the color filter 13. In this case, the color filter 13 is set on the housing 111 by way of, for example, a fitting, adhering process or placing the color filter 13 over the housing 111. In the current embodiment, the color filter 13 is a circular filter or a ring-shaped filter composed of three or more filter sectors of red, green and blue. The color filter 13 may also be a circular filter or a ring-shaped filter composed of one transparent block and three or more filter sectors of red, green and blue.

Referring again to FIG. 2A, the color wheel 1 of this embodiment further includes a first cap 14. The first cap 14 is set on the color filter 13, so that the color filter 13 is positioned between the first cap 14 and the motor 11. Also, the first cap 14 may cover the housing 111.

When the contact area between the color filter 13 and the housing 111 is not large enough, the position of the rotation center may be moved. Herein, the first cap 14 is used to enlarge the contact area between the color filter 13 and the housing 111. In addition, the first cap 14 is made of a vibration damping material.

Figure 2B:
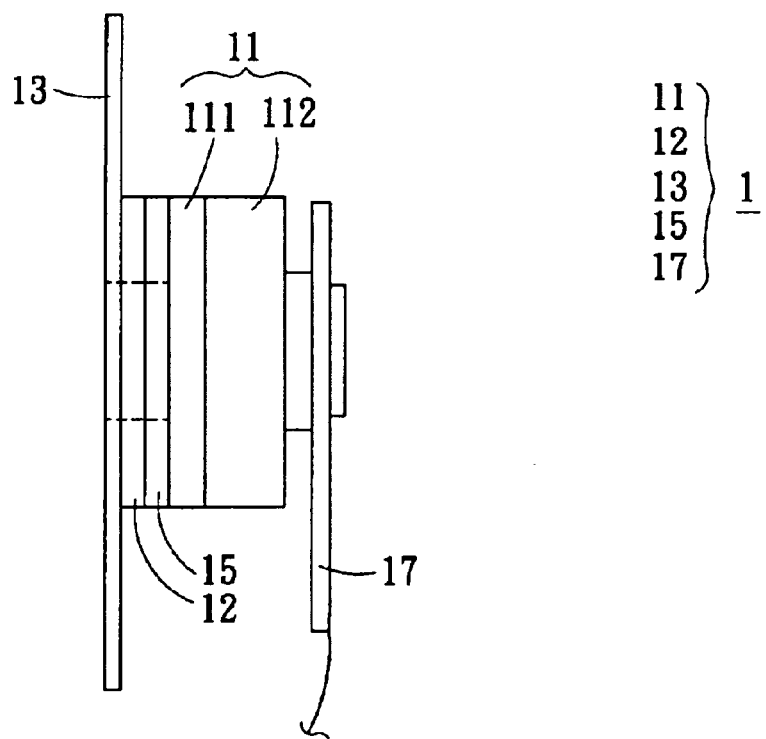
FIG. 2B is a schematic illustration that shows a side view of another color wheel in accordance with the first embodiment of the invention.
Figure 2C:
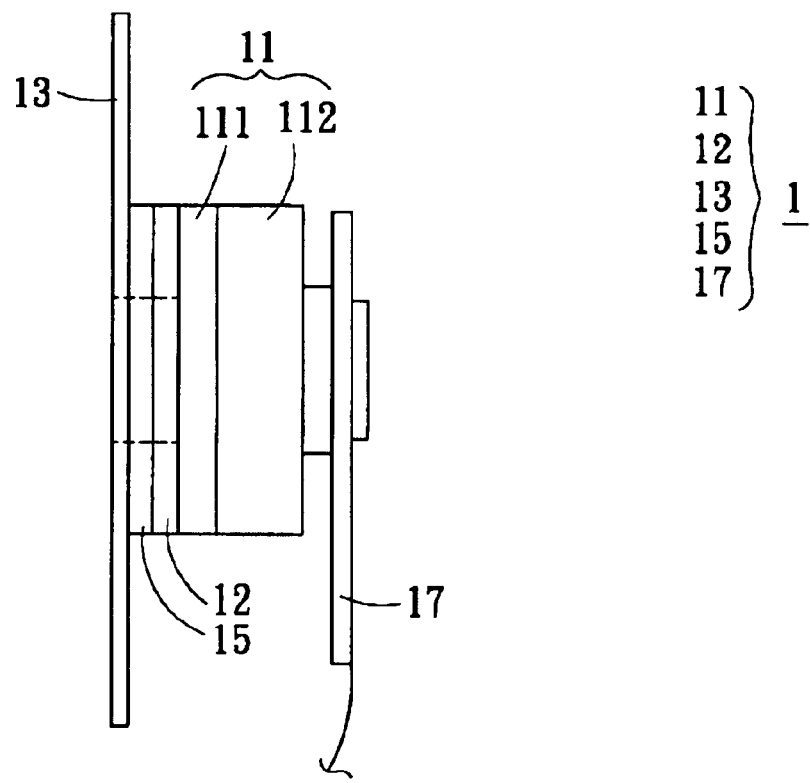
FIG. 2C is a schematic illustration that shows a side view of another color wheel in accordance with the first embodiment of the invention.
Figure 2D:
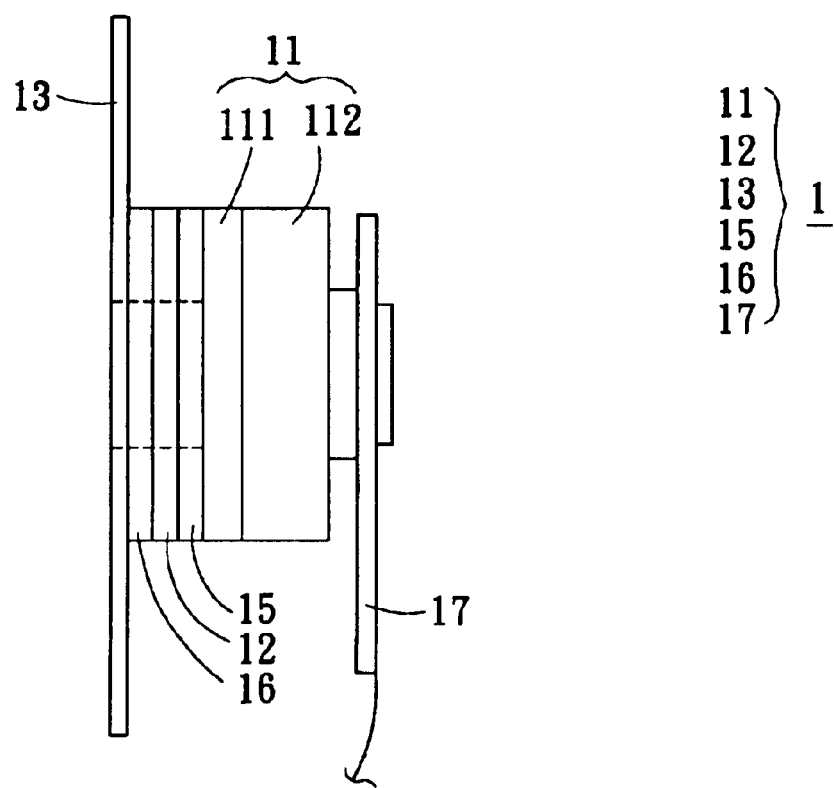
FIG. 2D is a schematic illustration that shows a side view of another color wheel in accordance with the first embodiment of the invention.

Referring to FIG. 2B and FIG. 2C, the color wheel 1 of this embodiment further includes a second cap 15. The second cap 15 is set on the housing 111 of the motor 11, so that the second cap 15 is positioned between the color filter 13 and the motor 11. As shown in FIG. 2B, the second cap 15 is positioned between the vibration damping element 12 and the motor 11. In addition, as shown in FIG. 2C, the second cap 15 is also positioned between the vibration damping element 12 and the color filter 13.

Moreover, referring again to FIG. 2D, the color wheel 1 of this embodiment further includes a third cap 16. The third cap 16 is positioned between the vibration damping element 12 and the color filter 13.

Since the second cap 15 and the third cap 16 in this embodiment have the same features and functions as the first cap 14, a detailed description thereof will be omitted.

Referring again to FIG. 2A, FIG. 2B, FIG. 2C and FIG. 2D, the color wheel 1 of this embodiment further includes a positioning plate 17 on which the motor body 112 is pivotally mounted. The positioning plate 17 is connected to an actuator (not shown) via wires (not shown). The actuator drives the motor body 112 to rotate about a central axis corresponding to the pivotal point between the positioning plate 17 and the motor body 112.

The Second Embodiment

Figure 3:
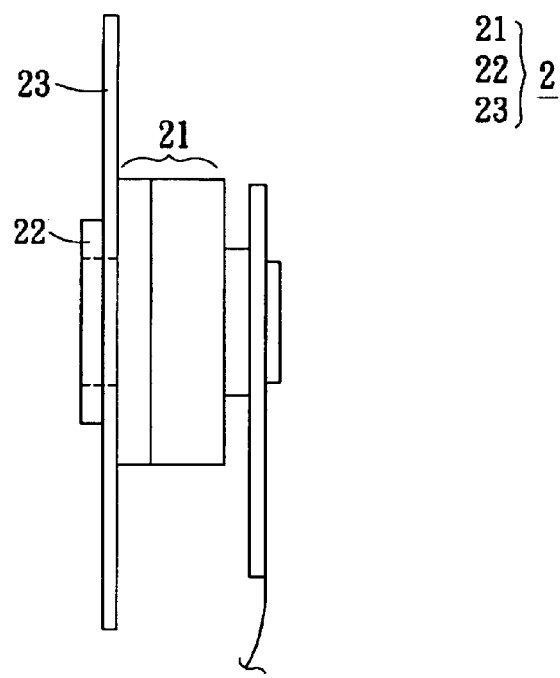
FIG. 3 is a schematic illustration that shows a side view of the color wheel in accordance with the second embodiment of the invention.

Referring to FIG. 3, in the current embodiment, the elements of a color wheel 2 have the same features and functions as those of the corresponding elements in the color wheel 1, except that the color filter 23 is positioned between a vibration damping element 22 and a motor 21.

Since the elements in this embodiment have the same features and functions as those of the corresponding elements in the color wheel 1, a detailed description thereof will be omitted.

In general, the motor for the color wheel rotates at a speed higher than 7200 rpm. When the rotation center of the color filter is place away from the central axis of the rotation shaft or the friction between the color filter and the air is produced, the color filter may be adversely influenced by vibration. Furthermore, the color wheel may also be adversely influenced by noise (volume is about 58 dBA, detect far from 4 cm).

In the first and the second embodiment of this invention, the vibration damping element is used in the color wheel to avoid the vibration of the color filter. Herein, noise produced by the color wheel is reduced under 52 dBA, and comfort of the user is further proved.

The Third Embodiment

Figure 4A:
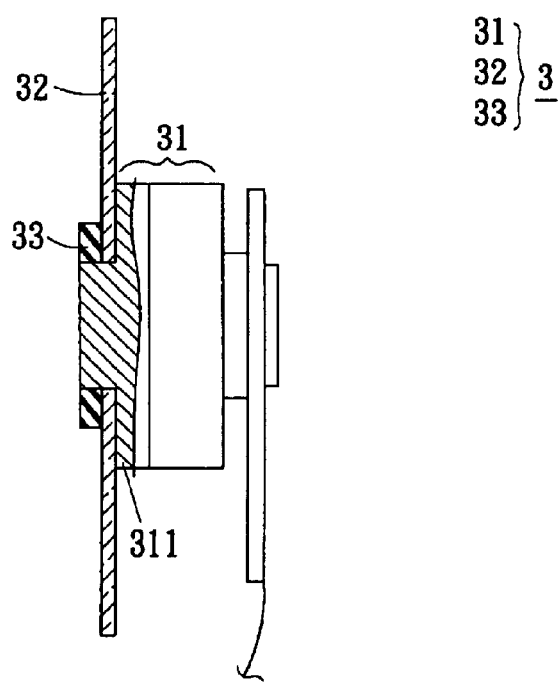
FIG. 4A is a schematic illustration that shows a cross-sectional view of the color wheel in accordance with the third embodiment of the invention.
Figure 4B:
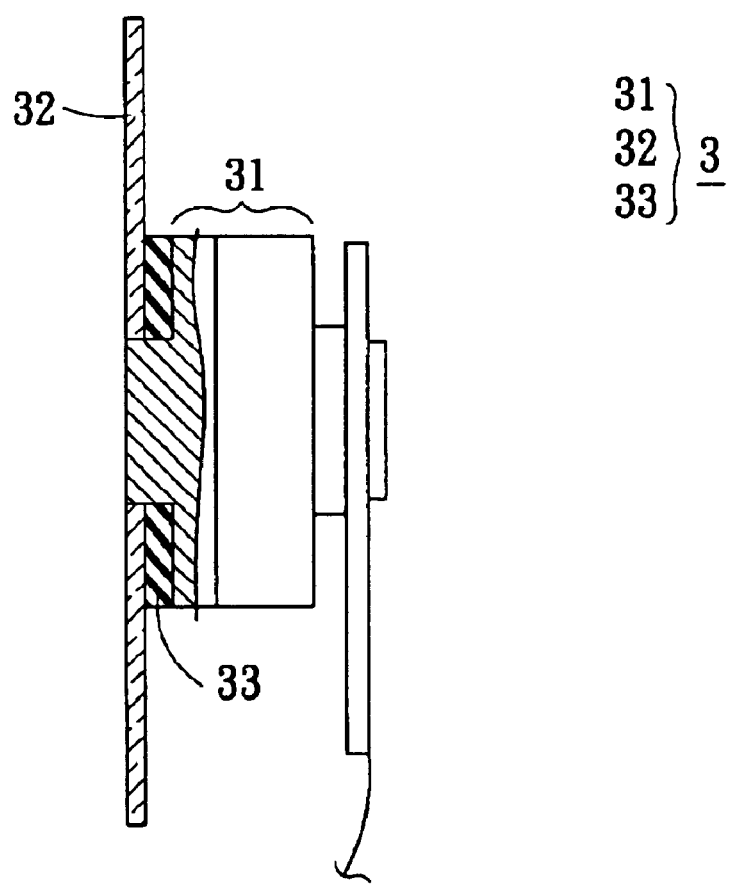
FIG. 4B is a schematic illustration that shows a cross-sectional view of another color wheel in accordance with the third embodiment of the invention.

Referring to FIG. 4A and FIG. 4B, a color wheel 3 provided by the third embodiment of the invention includes a motor 31, a color filter 32 and a cap 33. In this case, the cap 33 and the color filter 32 are set on the motor 31. Herein, the cap 33 is made of a vibration damping material.

In the current embodiment, the vibration damping material has the same feature and function as the vibration damping element in the color wheel 1.

Referring to FIG. 4A, the cap 33 is set on the color filter 32, so that the color filter 32 is positioned between the cap 33 and the motor 31. Herein, the cap 33 and the color filter 32 is set to the motor 31 by way of, for example, by adhering or fitting the cap 33 and the color filter 32 to the motor 31, or placing the cap 33 and the color filter 32 over the motor 31. In addition, the cap 33 also covers on the housing 311 of the motor 31.

Referring again to FIG. 4B, the cap 33 is positioned between the motor 31 and the color filter 32.

In this embodiment, the cap 33 is not only used to enlarge the contact area between the color filter 32 and the motor 31, but also avoids producing the vibration of the color filter 32 and noise in running.

Since the motor 31 and the color filter 32 in this embodiment have the same features and functions as those of the corresponding elements in the color wheel 1, detailed description thereof will be omitted.

In this invention, the vibration damping element or the vibration damping material is used in the color wheel. Compared to the prior art, the vibration and noise of the color filter may be reduced in this invention. Furthermore, the quality of the color wheel may also be improved. In addition, when the cap is made of a vibration damping material, not only may the cap enlarge the contact area between the color filter and the motor, but the cap may also dampen the vibration and noise caused by the color filter.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A color wheel, comprising:
   a motor including a housing and a motor body, the housing being set at a central axis of the motor body;
   a vibration damping element set on the housing of the motor;
   a color filter set on the housing of the motor, wherein the vibration damping element is positioned between the motor and the color filter; and
   a first cap set on the color filter, wherein the color filter is positioned between the first cap and the motor.

2. The color wheel according to claim 1, further comprising:
   a second cap set on the housing of the motor and positioned between the motor and the color filter.

3. The color wheel according to claim 2, wherein the second cap is positioned between the vibration damping element and the motor.

4. The color wheel according to claim 2, wherein the second cap is positioned between the vibration damping element and the color filter.

5. The color wheel according to claim 3, further comprising:
   a third cap set on the housing of the motor and positioned between the vibration damping element and the color filter.

6. The color wheel according to claim 1, wherein the first cap is made of a vibration damping material.

7. The color wheel according to claim 2, wherein the second cap is made of a vibration damping material.

8. The color wheel according to claim 5, wherein the third cap is made of a vibration damping material.

9. The color wheel according to claim 1, wherein the vibration damping element is made of a macromolecule material.

10. The color wheel according to claim 9, wherein the vibration damping element is made of rubber.

11. The color wheel according to claim 9, wherein the vibration damping element is made of silicon glue.

12. The color wheel according to claim 9, wherein the vibration damping element is made of plastic.

13. The color wheel according to claim 1, further comprising:
    a positioning plate on which the motor body is pivotally mounted.

14. The color wheel according to claim 1, wherein the filter is in a plane and wherein the housing is non-coincident with the plane of the filter.

15. The color wheel according to claim 1, wherein the vibrating damping element completely separates the housing and color filter.

16. A color wheel, comprising:
    a motor including a housing and a motor body, the housing being set at a central axis of the motor body;
    a color filter set on the housing of the motor; and
    a vibration damping element set on the housing of the motor, wherein the color filter is between the vibration damping element and the motor.

17. The color wheel according to claim 16, wherein the vibration damping element is made of a macromolecule material.

18. The color wheel according to claim 17, wherein the vibration damping element is made of rubber.

19. The color wheel according to claim 17, wherein the vibration damping element is made of silicon glue.

20. The color wheel according to claim 17, wherein the vibration damping element is made of plastic.

21. The color wheel according to claim 16, wherein the color filter is in a plane and the vibration damping element is in another plane which is non-coincident.

22. A color wheel comprising a motor, a color filter and a cap, the cap and the color filter being set on the motor, the cap being made of a vibration damping material.

23. The color wheel according to claim 22, wherein the cap is between the motor and the color filter.

24. The color wheel according to claim 22, wherein the cap is set on the color filter, the color filter is between the cap and the motor.

25. The color wheel according to claim 22, wherein the cap is made of a macromolecule material.

* * * * *